(12) United States Patent
Kashiwagi

(10) Patent No.: US 7,566,756 B2
(45) Date of Patent: Jul. 28, 2009

(54) ADDITION CURABLE SILICONE RESIN COMPOSITION AND SILICON LENS USING SAME

(75) Inventor: Tsutomu Kashiwagi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 12/078,689

(22) Filed: Apr. 3, 2008

(65) Prior Publication Data

US 2008/0249259 A1    Oct. 9, 2008

(51) Int. Cl.
C08G 77/12 (2006.01)
C08G 77/20 (2006.01)
C08G 77/08 (2006.01)

(52) U.S. Cl. .................. 525/478; 528/15; 528/31; 528/32; 525/479

(58) Field of Classification Search ........... 525/478; 528/15, 31, 32
See application file for complete search history.

(56) References Cited

U.S. PATENT DOCUMENTS

| | | | | |
|---|---|---|---|---|
| 3,294,718 A | * | 12/1966 | Antonen | 528/19 |
| 4,772,515 A | * | 9/1988 | Hara et al. | 428/447 |
| RE34,027 E | * | 8/1992 | Nakamura et al. | 428/35.8 |
| 5,764,181 A | * | 6/1998 | Fey et al. | 342/4 |
| 7,479,522 B2 | * | 1/2009 | Zhu | 524/588 |
| 2004/0097640 A1 | * | 5/2004 | Meguriya et al. | 524/588 |
| 2004/0214966 A1 | | 10/2004 | Tabei et al. | |

FOREIGN PATENT DOCUMENTS

JP    2005-76003 A    3/2005
JP    2006-324596 A    11/2006

* cited by examiner

*Primary Examiner*—Randy Gulakowski
*Assistant Examiner*—Michael Dollinger
(74) *Attorney, Agent, or Firm*—Birch, Stewart, Kolasch & Birch, LLP

(57) ABSTRACT

An addition curable silicone resin composition is provided. The composition includes two types of alkenyl group-containing organopolysiloxanes, and two types of organohydrogenpolysiloxanes, and a platinum group catalyst. The composition is cured to form a hard cured product with excellent flexibility and minimal surface tack, suited to a silicone lens.

5 Claims, 1 Drawing Sheet

ADDITION CURABLE SILICONE RESIN COMPOSITION AND SILICON LENS USING SAME

BACKGROUND OF THE INVENTION

1. Field of the Invention

The present invention relates to an addition curable silicone resin composition and a silicone lens that uses the composition, and relates particularly to an addition curable silicone resin composition that yields a cured product with minimal surface tack and favorable strength properties, and a silicone lens that is formed using this cured product and exhibits favorable levels of transparency and moldability, excellent shock resistance, and almost no surface tack.

2. Description of the Prior Art

Addition curable silicone rubber compositions form cured products that exhibit excellent properties of weather resistance and heat resistance and the like, as well as superior rubber-like properties such as hardness and elongation, and they are consequently used as coating materials and the like in a wide variety of applications (see patent reference 1). However, because the resulting cured products also exhibit surface tack, dust adhesion becomes a problem when these compositions are used as coating agents or the like for electrical or electronic components.

Cured products comprising hard resins obtained from silicone varnishes exhibit minimal surface tack, meaning the problem of dust adhesion does not arise, but such cured products suffer from a different problem in that because they lack adequate shock resistance, they tend to be prone to cracking, and particularly to cracking caused by thermal shocks.

It is known that adding a resin-like organopolysiloxane component to an addition-curable silicone rubber composition improves the strength of the cured product. For example, the patent reference 2 discloses an improvement in the strength of the cured product by using a branched (in other words, resin-like) organopolysiloxane as the alkenyl group-containing organopolysiloxane that is subjected to an addition reaction with an organohydrogenpolysiloxane. However, even in those cases where the strength of the cured product is increased by using a resin-like organopolysiloxane, surface tack and dust adhesion remain problems.

Accordingly, in the field of electrical and electronic component packaging, there is considerable demand for a silicone composition capable of forming a cured product that does not suffer from dust adhesion to the cured product surface, and exhibits excellent levels of crack resistance and shock resistance. In chip coating and casting applications, the use of solid or semisolid materials is problematic, and consequently a composition that is liquid and yet yields a tough cured product upon curing has been keenly sought.

The lenses for LED light emitting devices are conventionally formed by using a mechanical molding technique such as injection molding to mold a thermoplastic resin such as an acrylic resin or polycarbonate resin. However, as the output of such LED light emitting devices increases, these thermoplastic resins become less satisfactory in terms of their heat resistance and resistance to discoloration. Furthermore, because lead-free solders, which have recently become widespread, have a higher melting temperature than conventional solders, optical elements are typically soldered to substrates at temperatures of 260° C. or higher. If soldering is conducted at this type of high temperature, then lenses formed using conventional thermoplastic resins not only undergo deformation, but also suffer from yellowing as a result of the high temperature. As a result of these circumstances, a multitude of tests have been conducted into producing the lenses for LEDs and the like using silicone resins (for example, see patent reference 3).

However, when an addition curable silicone resin composition is used, the problems described above are evident. Namely, if a lens with a hollow structure is molded using the type of silicone material used in conventional lenses, then a hard silicone resin tends to yield a lens with a low degree of shock resistance, whereas a soft silicone rubber is prone to deformation, meaning that not only is the reliability of the lens optical properties poor, but the LED chip or wires or the like encapsulated within the rubber tend to be placed under stress. Moreover, with a low-viscosity silicone resin, burr generation also tends to be a problem during molding.

[Patent Reference 1] US 2004/0214966 A1
[Patent Reference 2] JP 2005-76003 A
[Patent Reference 3] JP 2006-324596 A

SUMMARY OF THE INVENTION

An object of the present invention is to provide an addition curable silicone resin composition that is a liquid prior to curing and yields a hard resin upon curing, and yet is still able to form a cured product that exhibits excellent flexibility, superior shock resistance and minimal surface tack, and also to provide a cured product of this resin composition.

Another object of the present invention is to provide a silicone lens that exhibits excellent levels of shock resistance, flexibility and transparency.

As a result of intensive investigation aimed at achieving the above objects, the inventors of the present invention discovered that by combining two specific alkenyl group-containing organopolysiloxanes, and combining two specific organohydrogensiloxanes, they were able to achieve the achieve the above objects.

In other words, a first aspect of the present invention provides an addition curable silicone resin composition, comprising:

(A) an organopolysiloxane having a resin structure comprising $R^1SiO_{1.5}$ units, $R^2{}_2SiO$ units and $R^3{}_aR^4{}_bSiO_{(4-a-b)/2}$ units (wherein, $R^1$, $R^2$ and $R^3$ each represent, independently, a hydroxyl group, methyl group, ethyl group, propyl group, cyclohexyl group or phenyl group, each $R^4$ represents, independently, a vinyl group or allyl group, a represents 0, 1 or 2, and b represents 1 or 2, provided that a+b is 2 or 3), in which at least a portion of the $R^2{}_2SiO$ units are connected in a continuous repeating sequence, and the number of units in the repeating sequence is within a range from 5 to 50, (B) an organohydrogenpolysiloxane having a resin structure comprising $R^1SiO_{1.5}$ units, $R^2{}_2SiO$ units and $R^3{}_cH_dSiO_{(4-c-d)/2}$ units (wherein, $R^1$, $R^2$ and $R^3$ are as defined above, c represents 0, 1 or 2, and d represents 1 or 2, provided that c+d is 2 or 3), in which at least a portion of the $R^2{}_2SiO$ units are connected in a continuous repeating sequence, and the number of units in the repeating sequence is within a range from 5 to 50, the organohydrogenpolysiloxane provided in sufficient quantity that the molar ratio of hydrogen atoms bonded to silicon atoms within the component (B) relative to the combined total of vinyl groups and allyl groups within the component (A) is within a range from 0.1 to 4.0, (C) an organopolysiloxane having two or more alkenyl groups within each molecule, which is different from the component (A) and is either a liquid or a solid at 25° C., (D) an organohydrogenpolysiloxane having two or more hydrogen atoms bonded to silicon atoms within each molecule, which has a viscosity at 25° C. within a range from 0.5 to 50,000 mPa·s, and in a mixed state with the organopolysiloxane of the component (C), has a viscosity at 25° C. within a range from 10 to 100,000 mPa·s, wherein the quantities of the component (C) and the component (D) are sufficient that the molar ratio of the combined quantity of hydrogen atoms bonded to silicon atom within the component (B) and the component (D), relative to the combined quantity of alkenyl groups within the component (A) and the component (C), is within a range from 0.1 to 4.0, and (E) an effective curing quantity of a platinum group metal-based catalyst.

In a preferred embodiment of the composition of the present invention, either one of, or both, the component (A) and the component (B) contains silanol groups. This preferred embodiment offers the advantage of an improved level of adhesion to all manner of materials.

Furthermore, in a preferred configuration of the composition of the present invention, the alkenyl group-containing organopolysiloxane of the component (C) comprises:

from 30 to 100% by mass of an organopolysiloxane represented by an average composition formula (1):

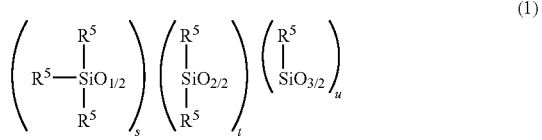

(wherein, $R^5$ represents identical or different, substituted or unsubstituted monovalent hydrocarbon groups, from 1.0 to 50.0% of all the monovalent hydrocarbon groups are alkenyl groups, s, t and u indicate relative molar quantities of the three siloxane units to which they are appended, $u/(s+t+u)=0.55$ to 0.95, $t/(s+t+u)=0.05$ to 0.45, and $s/(s+t+u)=0$ to 0.05), and from 0 to 70% by mass of a straight-chain organopolysiloxane represented by an average composition formula (2):

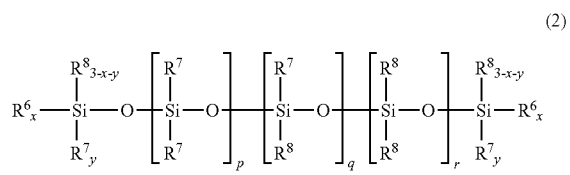

(wherein, $R^6$ represents an alkenyl group, $R^7$ represents identical or different, substituted or unsubstituted monovalent hydrocarbon groups, $R^8$ represents an aromatic monovalent hydrocarbon group, p, q and r are integers that satisfy $0 \leq p \leq 500$, $0 \leq q \leq 250$ and $0 \leq r \leq 250$ respectively, provided that $0 \leq p+q+r \leq 500$, and x and y are each 0, 1, 2 or 3, provided that $0 \leq x+y \leq 3$), and the combined total of the organopolysiloxane represented by the average composition formula (1) and the organopolysiloxane represented by the average composition formula (2) is 100% by mass.

A second aspect of the present invention provides a cured product obtained by curing the above addition curable silicone resin composition.

The cured product is useful as a lens material.

Accordingly, a third aspect of the present invention provides a colorless and transparent silicone lens, comprising a cured product of the above addition curable silicone resin composition.

The composition of the present invention enables the formation of a cured product which, although being a hard resin, exhibits excellent flexibility and shock resistance, and minimal surface tack.

Moreover, because the composition of the present invention is a liquid, it exhibits excellent moldability. This means special new molding methods or molding devices are unnecessary, and molding can be conducted easily using conventional molding devices such as dispensers, transfer molding devices, compression molding devices, and injection molding devices. Burr generation upon molding is also very minimal.

Furthermore, a silicone lens of the present invention not only exhibits excellent levels of flexibility, transparency and shock resistance, but also suffers almost no surface tack.

DETAILED DESCRIPTION OF THE PREFERRED EMBODIMENTS

Figure 1:
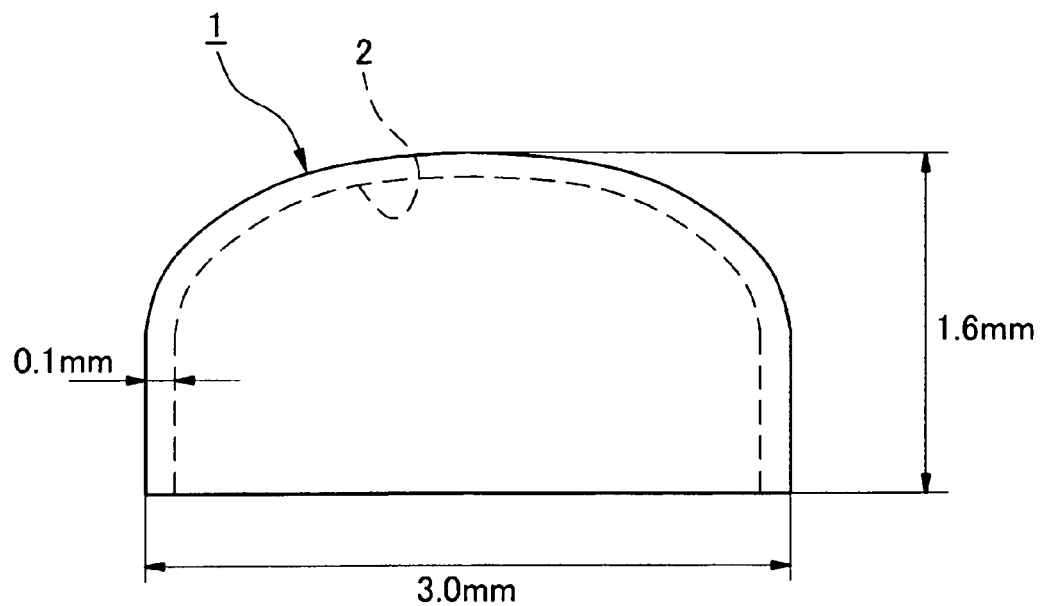
FIG. 1 is a front view showing a molded hollow lens used for measuring the mechanical properties of silicone lenses in the examples.

A more detailed description of the present invention is provided below. In the following description, Me represents a methyl group, Et represents an ethyl group, Ph represents a phenyl group, and Vi represents a vinyl group.

[Addition Curable Silicone Resin Composition]

-(A) Organopolysiloxane Having Resin Structure-

The organopolysiloxane having a resin structure (namely, a three dimensional network-type structure) of the component (A), which represents one of the important components of the composition of the present invention, comprises $R^1SiO_{1.5}$ units, $R^2_2SiO$ units and $R^3_aR^4_bSiO_{(4-a-b)/2}$ units (wherein, $R^1$, $R^2$ and $R^3$ each represent, independently, a hydroxyl group, methyl group, ethyl group, propyl group, cyclohexyl group or phenyl group, each $R^4$ represents, independently, a vinyl group or allyl group, a represents 0, 1 or 2, and b represents 1 or 2, provided that a+b is 2 or 3), and includes a partial structure in which at least a portion of the $R^2_2SiO$ units are connected in a continuous repeating sequence, wherein the number of units in the repeating sequence is within a range from 5 to 50, preferably from 8 to 30, and even more preferably from 10 to 20.

The partial structure in which at least a portion of the $R^2_2SiO$ units are connected in a continuous repeating sequence, and in which the number of units in the repeating sequence is within a range from 5 to 50, refers to a straight-chain diorganopolysiloxane chain structure represented by a general formula (3) shown below.

(wherein, m represents an integer from 5 to 50)

In the organopolysiloxane of the component (A), at least a portion of the $R^2_2SiO$ units, and preferably 50 mol % or greater (namely, 50 to 100 mol %) and even more preferably 80 mol % or greater (namely, 80 to 100 mol %) of the $R^2_2SiO$ units form a chain structure represented by the general formula (3) within the organopolysiloxane molecule.

In a molecule of the component (A), the presence of the $R^2_2SiO$ units causes the polymer molecule to extend in a straight-chain type structure, whereas the $R^1SiO_{1.5}$ units cause branching of the polymer molecule, or the formation of a three dimensional network structure. The $R^4$ groups (which each represent, independently, a vinyl group or allyl group) within the $R^3_aR^4_bSiO_{(4-a-b)/2}$ units perform the role of curing the composition of the present invention by undergoing a hydrosilylation addition reaction with the hydrogen atoms bonded to silicon atoms (namely, SiH groups) of the $R^3_cH_dSiO_{(4-c-d)/2}$ units within the component (B) described below.

The molar ratio between the three essential siloxane units that constitute the component (A), namely the molar ratio of $R^1SiO_{1.5}$ units:$R^2_2SiO$ units:$R^3_aR^4_bSiO_{(4-a-b)/2}$ units is preferably within a range from 90 to 24:75 to 9:50 to 1, and is even more preferably within a range from 70 to 28:70 to 20:10 to 2 (provided the total is 100), as such a ratio yields more favorable properties for the resulting cured product.

The polystyrene referenced weight average molecular weight of the component (A) determined by gel permeation chromatography (GPC) is typically within a range from 3,000 to 1,000,000, and is preferably from 10,000 to 100,000, as this ensures that the polymer is a solid or semisolid, and provides favorable levels of workability and curability.

This type of organopolysiloxane having a resin structure can be synthesized, for example, by combining the compounds that act as the raw materials for each of the units, in quantities that enable the three siloxane units to be formed within the product polymer in the required molar ratio described above, and then conducting a cohydrolysis-condensation in the presence of an acid catalyst.

Examples of suitable raw materials for the $R^1SiO_{1.5}$ units include chlorosilanes such as $MeSiCl_3$, $EtSiCl_3$, $PhSiCl_3$, propyltrichlorosilane and cyclohexyltrichlorosilane, and the alkoxysilanes such as methoxysilanes that correspond with each of these chlorosilanes.

Examples of the raw material for the $R^2_2SiO$ units include the structures shown below.

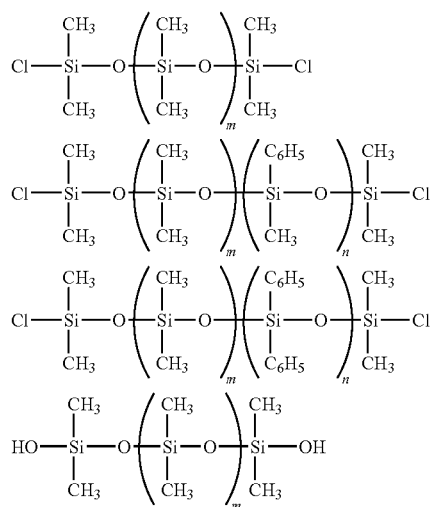

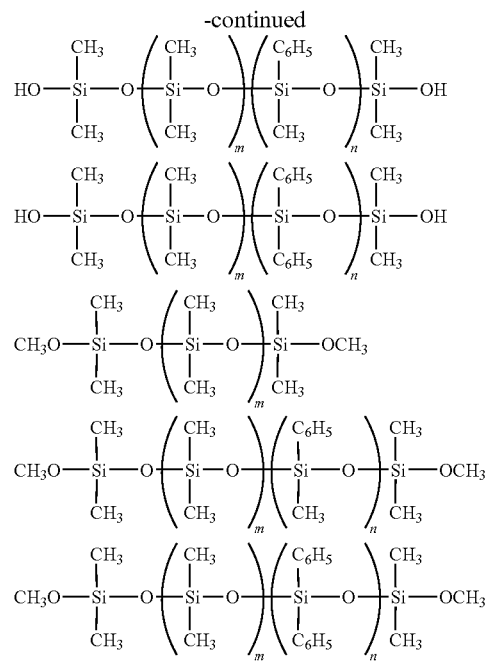

(wherein, m represents an integer from 5 to 50 (an average value), and n represents an integer from 0 to 50 (an average value))

Furthermore, the $R^3_aR^4_bSiO_{(4-a-b)/2}$ units represent any suitable combination of one or more siloxane units selected from amongst $R^3R^4SiO$ units, $R^3_2R^4SiO_{1.5}$ units, $R^4_2SiO$ units, and $R^3R^4_2SiO_{0.5}$ units. The raw materials for these units include chlorosilanes such as $Me_2ViSiCl$, $MeViSiCl_2$, $Ph_2ViSiCl$ and $PhViSiCl_2$, and alkoxysilanes such as methoxysilanes that correspond with each of these chlorosilanes.

In the present invention, during production of the organopolysiloxane of the component (A) by cohydrolysis and condensation of the raw materials described above, the $R^1SiO_{1.5}$ units, $R^2_2SiO$ units and/or $R^3_aR^4_bSiO_{(4-a-b)/2}$ units include siloxane units that contain a silanol group. The organopolysiloxane of the component (A) typically comprises not more than 10 mol % (namely, from 0 to 10 mol %), and preferably not more than 5 mol % (namely, 0 to 5 mol %) of these silanol group-containing siloxane units relative to the combined total of all the siloxane units. Examples of the silanol group-containing siloxane units include $R^1(HO)SiO$ units, $R^1(HO)_2SiO_{0.5}$ units, and $R^2_2(HO)SiO_{0.5}$ units.

-(B) Organohydrogenpolysiloxane Having Resin Structure-

The organohydrogenpolysiloxane having a resin structure (namely, a three dimensional network-type structure) of the component (B), which represents one of the important components of the composition of the present invention, comprises $R^1SiO$ 0.5 units, $R^2_2SiO$ units and $R^3_cH_dSiO_{(4-c-d)/2}$ units (wherein, $R^1$, $R^2$ and $R^3$ are as defined above, c represents 0, 1 or 2, and d represents 1 or 2, provided that c+d is 2 or 3), and includes a partial straight-chain siloxane structure in which at least a portion of the $R^2_2SiO$ units are connected in a continuous repeating sequence and the number of units in the repeating sequence is within a range from 5 to 50, preferably from 8 to 30, and even more preferably from 10 to 20.

In a similar manner to that described for the component (A), the partial structure in which at least a portion of the $R^2_2SiO$ units are connected in a continuous repeating sequence, and in which the number of units in the repeating sequence is within a range from 5 to 50, refers to a structure in which at least a portion of the $R^2{}_2SiO$ units, and preferably 50 mol % or greater (namely, 50 to 100 mol %) and even more preferably 80 mol % or greater (namely, 80 to 100 mol %) of the $R^2{}_2SiO$ units within the component (B) form a straight-chain diorganopolysiloxane chain structure represented by the above general formula (3) within the organohydrogenpolysiloxane molecule of the component (B).

In a molecule of the component (B), the presence of the $R^2{}_2SiO$ units causes the polymer molecule to extend in a straight-chain type structure, whereas the $R^1SiO_{1.5}$ units cause branching of the polymer molecule, or the formation of a three dimensional network structure. The hydrogen atoms bonded to silicon atoms within the $R^3{}_cH_dSiO_{(4-c-d)/2}$ units perform the role of curing the composition of the present invention by undergoing a hydrosilylation addition reaction with the alkenyl groups within the component (A).

The molar ratio between the three essential siloxane units that constitute the component (B), namely the molar ratio of $R^1SiO_{1.5}$ units:$R^2{}_2SiO$ units:$R^3{}_cH_dSiO_{(4-c-d)/2}$ units is preferably within a range from 90 to 24:75 to 9:50 to 1, and is even more preferably within a range from 70 to 28:70 to 20:10 to 2 (provided the total is 100), as such a ratio yields more favorable properties for the resulting cured product.

The polystyrene referenced weight average molecular weight of the component (B) determined by GPC is typically within a range from 3,000 to 1,000,000, and is preferably from 10,000 to 100,000, as this provides more favorable levels of workability and curability.

This type of organohydrogenpolysiloxane having a resin structure can be synthesized, for example, by combining the compounds that act as the raw materials for each of the units, in quantities that enable the three siloxane units to be formed within the product polymer in the required molar ratio described above, and then conducting a cohydrolysis-condensation.

Examples of suitable raw materials for the $R^1SiO_{1.5}$ units include chlorosilanes such as $MeSiCl_3$, $EtSiCl_3$, $PhSiCl_3$, propyltrichlorosilane and cyclohexyltrichlorosilane, and the alkoxysilanes such as methoxysilanes that correspond with each of these chlorosilanes.

Examples of the raw material for the $R^2{}_2SiO$ units include the structures shown below.

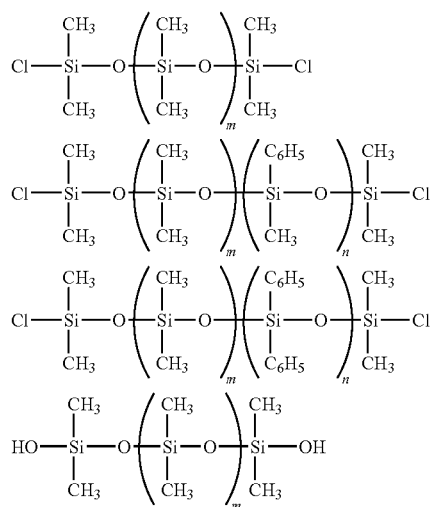

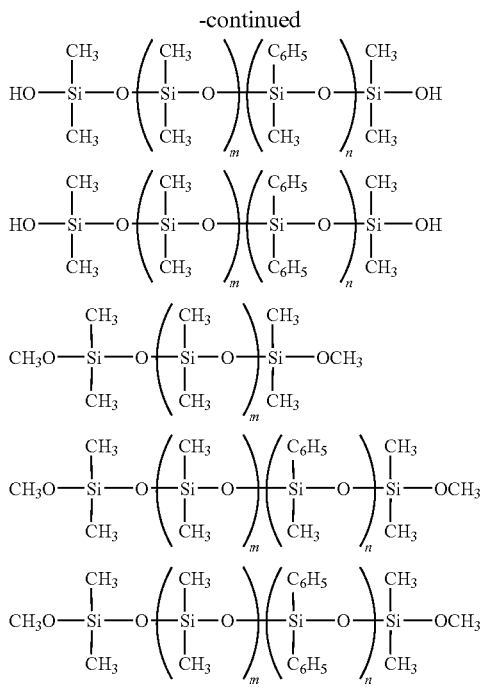

(wherein, m represents an integer from 5 to 50 (an average value), and n represents an integer from 0 to 50 (an average value))

Furthermore, the $R^3{}_cH_dSiO_{(4-c-d)/2}$ units represent any suitable combination of one or more siloxane units selected from amongst $R^3HSiO$ units, $R^3{}_2HSiO_{0.5}$ units, $H_2SiO$ units, and $R^3H_2SiO_{0.5}$ units. The raw materials for these units include chlorosilanes such as $Me_2HSiCl$, $MeHSiCl_2$, $Ph_2HSiCl$ and $PhHSiCl_2$, and alkoxysilanes such as methoxysilanes that correspond with each of these chlorosilanes.

In the present invention, during production of the organohydrogenpolysiloxane of the component (B) by cohydrolysis and condensation of the raw materials described above, the $R^1SiO_{1.5}$ units, $R^2{}_2SiO$ units and/or $R^3{}_cH_dSiO_{(4-c-d)/2}$ units include siloxane units that contain a silanol group. The organohydrogenpolysiloxane of the component (B) typically comprises not more than 10 mol % (namely, from 0 to 10 mol %), and preferably not more than 5 mol % (namely, 0 to 5 mol %) of these silanol group-containing siloxane units relative to the combined total of all the siloxane units. Examples of the silanol group-containing siloxane units include $R^1(HO)SiO$ units, $R^1(HO)_2SiO_{0.5}$ units, and $R^2{}_2(HO)SiO_{0.5}$ units.

The blend quantity of the organohydrogenpolysiloxane of the component (B) is sufficient that the molar ratio of hydrogen atoms bonded to silicon atoms (SiH groups) within the component (B) relative to the combined total of vinyl groups and allyl groups within the component (A) is typically within a range from 0.1 to 4.0, preferably from 0.5 to 3.0, and even more preferably from 0.8 to 2.0. If this ratio is less than 0.1, then the curing reaction proceeds poorly, and achieving a silicone cured product becomes difficult, whereas if the ratio exceeds 4.0, then a large quantity of unreacted SiH groups remains within the cured product, which can cause changes in the properties of the cured product over time.

-(C) Second Alkenyl Group-Containing Organopolysiloxane-

The component (C) is an organopolysiloxane having two or more alkenyl groups within each molecule, which is different from the component (A) and is either a liquid or a solid at 25° C.

Examples of the organopolysiloxane having two or more alkenyl groups of the component (C) include alkenyl group-containing organopolysiloxanes with three dimensional, straight-chain and/or cyclic structures that do not include the type of structure described above in which 5 to 50 $R^2_2SiO$ units represented by the aforementioned general formula (3) are connected in a continuous repeating sequence. In other words, even if $R^2_2SiO$ units are present within the structure, they are arranged randomly with other siloxane units, and even if the $R^2_2SiO$ units form a partial repeating sequence, the number of units in the repeating sequence is not more than 4.

Specific examples of the alkenyl group-containing organopolysiloxane of the component (C) include organopolysiloxanes represented by the average composition formula (1) shown below, and straight-chain organopolysiloxanes represented by the average composition formula (2) shown below.

Average composition formula (1): Organopolysiloxanes

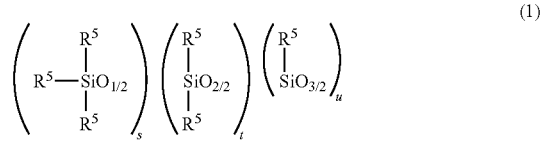

(wherein, $R^5$ represents identical or different, substituted or unsubstituted monovalent hydrocarbon groups, from 1.0 to 50.0% of all these monovalent hydrocarbon groups are alkenyl groups, s, t and u indicate the relative molar quantities of the three siloxane units to which they are appended, and satisfy: u/(s+t+u)=0.55 to 0.95, t/(s+t+u)=0.05 to 0.45, and s/(s+t+u)=0 to 0.05).

The organopolysiloxanes represented by this average composition formula (1) are distinguished from the component (A) by the fact that the $R^5_2SiO$ units are not arranged in any continuous repeating sequences of 5 to 50 units, but are rather dispersed randomly with the $R^5SiO_{3/2}$ units (so that even if a partial repeating sequence of $R^5_2SiO$ units exists, the number of units in the repeating sequence is not more than 4).

In the average composition formula (1), $R^5$ is preferably a substituted or unsubstituted monovalent hydrocarbon group containing from 1 to 20, and even more preferably 1 to 10, carbon atoms.

Examples of the substituted or unsubstituted hydrocarbon groups represented by $R^5$ in the average composition formula (1) include alkenyl groups, aromatic hydrocarbon groups, other hydrocarbon groups, and substituted hydrocarbon groups in which a portion of, or all of, the hydrogen atoms bonded to carbon atoms within these hydrocarbon groups have been substituted. Specific examples of representative alkenyl groups include lower alkenyl groups of 2 to 4 carbon atoms such as a vinyl group, allyl group, propenyl group, isopropenyl group or butenyl group. Specific examples of representative aromatic hydrocarbon groups include aryl groups such as a phenyl group or tolyl group, and aralkyl groups such as a benzyl group. Specific examples of other monovalent hydrocarbon groups include alkyl groups such as a methyl group, ethyl group, propyl group or butyl group, and cycloalkyl groups such as a cyclohexyl group. Examples of substituted hydrocarbon groups include halogen-substituted monovalent hydrocarbon groups in which a portion of the hydrogen atoms bonded to carbon atoms within the above unsubstituted hydrocarbon groups have been substituted with a halogen atom such as a chlorine atom, bromine atom or fluorine atom, and specific examples include halogen-substituted alkyl groups such as a chloromethyl group, chloropropyl group or 3,3,3-trifluoropropyl group.

Average composition formula (2): Straight-chain organopolysiloxanes

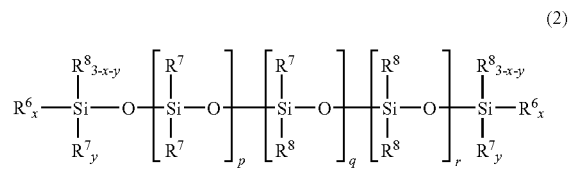

(wherein, $R^6$ represents an alkenyl group, $R^7$ represents identical or different, substituted or unsubstituted monovalent hydrocarbon groups, $R^8$ represents an aromatic monovalent hydrocarbon group, p, q and r are integers that satisfy $0 \leq p \leq 500$, $0 \leq q \leq 250$ and $0 \leq r \leq 250$ respectively, provided that $0 \leq p+q+r \leq 500$, and x and y are each 0, 1, 2 or 3, provided that $0 \leq x+y \leq 3$).

In this average composition formula (2), the alkenyl groups represented by $R^6$ are preferably lower alkenyl groups of 2 to 8, and even more preferably 2 to 6 carbon atoms, such as a vinyl group, allyl group, propenyl group, isopropenyl group or butenyl group. Specific examples of the unsubstituted monovalent hydrocarbon groups represented by $R^7$ include alkyl groups such as a methyl group, ethyl group, propyl group or butyl group, and cycloalkyl groups such as a cyclohexyl group, whereas examples of substituted hydrocarbon groups include halogen-substituted monovalent hydrocarbon groups in which a portion of the hydrogen atoms bonded to carbon atoms within the above unsubstituted hydrocarbon groups have been substituted with a halogen atom such as a chlorine atom, bromine atom or fluorine atom, and particularly representative examples include halogen-substituted alkyl groups such as a chloromethyl group, chloropropyl group or 3,3,3-trifluoropropyl group. The number of carbon atoms within these unsubstituted or substituted hydrocarbon groups is preferably within a range from 1 to 20, and even more preferably from 1 to 10. Furthermore, the aromatic monovalent hydrocarbon groups represented by $R^8$ are preferably aromatic monovalent hydrocarbon groups of 6 to 12 carbon atoms, including aryl groups such as a phenyl group or tolyl group, and aralkyl groups such as a benzyl group.

The alkenyl groups within the component (C) typically represent from 1 to 50 mol %, preferably from 2 to 40 mol %, and even more preferably from 5 to 30 mol %, of all the monovalent hydrocarbon groups within the component (C). If the alkenyl group content is to low, then a cured product cannot be formed, whereas if too high, the mechanical properties of the resulting cured product tend to deteriorate.

The aromatic hydrocarbon groups typically represent from 0 to 95 mol %, preferably from 10 to 90 mol %, and even more preferably from 20 to 80 mol %, of all the monovalent hydrocarbon groups within the component (C). Ensuring that the cured resin includes an appropriate quantity of aromatic hydrocarbon groups improves the mechanical properties, and also facilitates production of the resin. Furthermore, introducing aromatic hydrocarbon groups also enables the refractive index of the resin to be controlled.

A three dimensional organopolysiloxane represented by the average composition formula (1) that does not include the type of structure described above in which 5 to 50 $R^5{}_2SiO$ units are connected in a continuous repeating sequence preferably represents from 30 to 100% by mass of the entire component (C). A straight-chain organopolysiloxane represented by the average composition formula (2) preferably represents from 0 to 70% by mass of the entire component (C).

Specific examples of the straight-chain organopolysiloxane represented by the average composition formula (2) include the structures shown below.

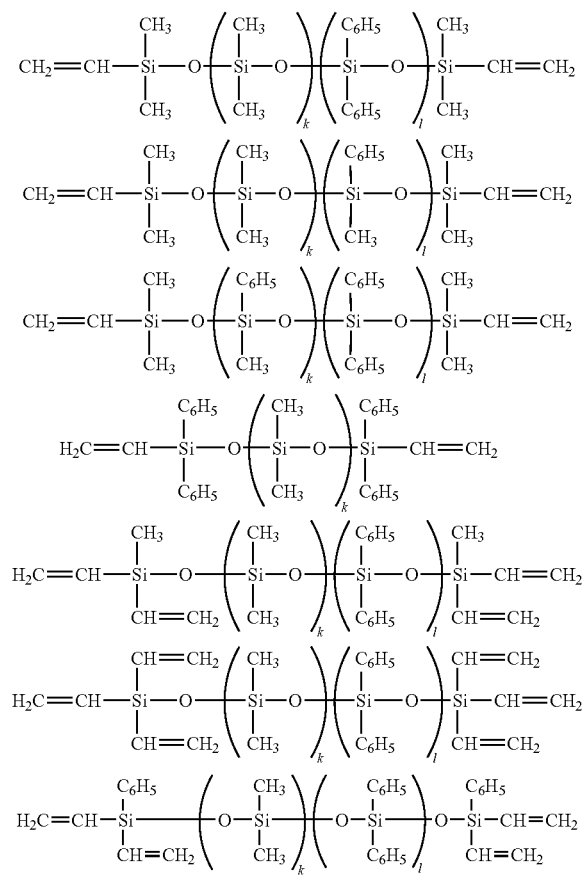

(In each of the above formulas, k and 1 each represent an integer from 0 to 1,000, provided that k and 1 satisfy: $0 \leq k+1 \leq 1{,}000$, and preferably $5 \leq k+1 \leq 500$, and provided that $0 \leq 1/(k+1) \leq 0.5$)

-(D) Second Organohydrogenpolysiloxane-

The organohydrogenpolysiloxane of the component (D) is an organohydrogenpolysiloxane having two or more hydrogen atoms bonded to silicon atoms within each molecule, which has a viscosity at 25° C. within a range from 0.5 to 50,000 mPa·s, and in a mixed state with the aforementioned organopolysiloxane of the component (C), has a viscosity at 25° C. within a range from 10 to 100,000 mPa·s. The organohydrogenpolysiloxane of the component (D), together with the aforementioned component (B), functions as a cross-linking agent for the components (A) and (C). A cured product is formed as a result of the addition reaction between the SiH groups within the component (D) and the component (B), and the alkenyl groups such as vinyl groups within the component (A) and the component (C).

The organohydrogenpolysiloxane of the component (D) has a viscosity at 25° C. within a range from 0.5 to 50,000 mPa·s, and has two or more, typically from 2 to 500, preferably from 3 to 300, and even more preferably from 4 to approximately 200, hydrogen atoms bonded to silicon atoms (namely, SiH groups) within each molecule. This organohydrogenpolysiloxane is preferably an organohydrogenpolysiloxane with a three dimensional, straight-chain, branched and/or cyclic structure, and examples include the compounds represented by an average composition formula (4) shown below.

In the above average composition formula (4), $R^9$ represents an unsubstituted or substituted monovalent hydrocarbon group that is bonded to a silicon atom, contains no aliphatic unsaturated bonds, and preferably contains from 1 to 10 carbon atoms. Examples of the unsubstituted monovalent hydrocarbon group include alkyl groups such as a methyl group, ethyl group, propyl group, isopropyl group, butyl group, isobutyl group, tert-butyl group, pentyl group, neopentyl group, hexyl group, octyl group, nonyl group or decyl group; cycloalkyl groups such as a cyclohexyl group; aryl groups such as a phenyl group, tolyl group, xylyl group or naphthyl group; and aralkyl groups such as a benzyl group, phenylethyl group or phenylpropyl group. Examples of the substituted monovalent hydrocarbon group include groups in which either a portion of, or all of, the hydrogen atoms within the above hydrocarbon groups have been substituted with a halogen atom such as a fluorine atom, bromine atom or chlorine atom, such as a chloromethyl group, chloropropyl group, bromoethyl group or trifluoropropyl group. The unsubstituted or substituted monovalent hydrocarbon groups represented by $R^9$ are preferably alkyl groups and/or aryl groups, and methyl groups and phenyl groups are particularly desirable.

In the average composition formula (4), e and f are positive numbers that satisfy $0.7 \leq e \leq 2.1$ and $0.001 \leq f \leq 1.0$ respectively, provided that $0.8 \leq e+f \leq 3.0$, and are preferably positive numbers that satisfy $1.0 \leq e \leq 2.0$ and $0.01 \leq f \leq 1.0$ respectively, provided that $1.5 \leq e+f \leq 2.5$.

The two or more, and preferably three or more, SiH groups contained within each molecule may be positioned solely at the molecular chain terminals, solely at non-terminal positions (within the molecular chain), or may be positioned at both these locations. Furthermore, the number of silicon atoms within each molecule of the organohydrogenpolysiloxane (namely, the polymerization degree) is typically within a range from 2 to 500, preferably from 3 to 300, and even more preferably from 4 to approximately 200, and the organohydrogenpolysiloxane is preferably a liquid at room temperature (25° C.), with a viscosity at 25° C. that is typically within a range from 0.5 to 50,000 mPa·s, and even ore preferably from 1.0 to 10,000 mPa·s.

In those cases where the organohydrogenpolysiloxane of the component (D) includes aromatic hydrocarbon groups such as aryl groups and aralkyl groups, the compatibility improves with alkenyl group-containing organopolysiloxanes of the component (C) in which aromatic hydrocarbon groups have been introduced to raise the refractive index, and this improved compatibility enables the formation of a cured product with superior transparency.

Specific examples of the organohydrogenpolysiloxane of the component (D) include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, cyclic copolymers of methylhydrogensiloxane and dimethylsiloxane, methylhydrogenpolysiloxane with both terminals blocked with trimethylsiloxy groups, copolymers of dimethylsiloxane and methylhydrogensiloxane with both terminals blocked with trimethylsiloxy groups, dimethylpolysiloxane with both terminals blocked with dimethylhydrogensiloxy groups, copolymers of dimethylsiloxane and methylhydrogensiloxane with both terminals blocked with dimethylhydrogensiloxy groups, copolymers of methylhydrogensiloxane and diphenylsiloxane with both terminals blocked with trimethylsiloxy groups, copolymers of methylhydrogensiloxane, diphenylsiloxane and dimethylsiloxane with both terminals blocked with trimethylsiloxy groups, copolymers of methylhydrogensiloxane, methylphenylsiloxane and dimethylsiloxane with both terminals blocked with trimethylsiloxy groups, copolymers of methylhydrogensiloxane, dimethylsiloxane and diphenylsiloxane with both terminals blocked with dimethylhydrogensiloxy groups, copolymers of methylhydrogensiloxane, dimethylsiloxane and methylphenylsiloxane with both terminals blocked with dimethylhydrogensiloxy groups, and compounds in which a portion of, or all of, the methyl groups in each of the above compounds have been substituted, either with other alkyl groups such as ethyl groups or propyl groups, or with aryl groups such as phenyl groups.

Compounds with the types of structures shown below can also be used as the organohydrogenpolysiloxane of the component (D).

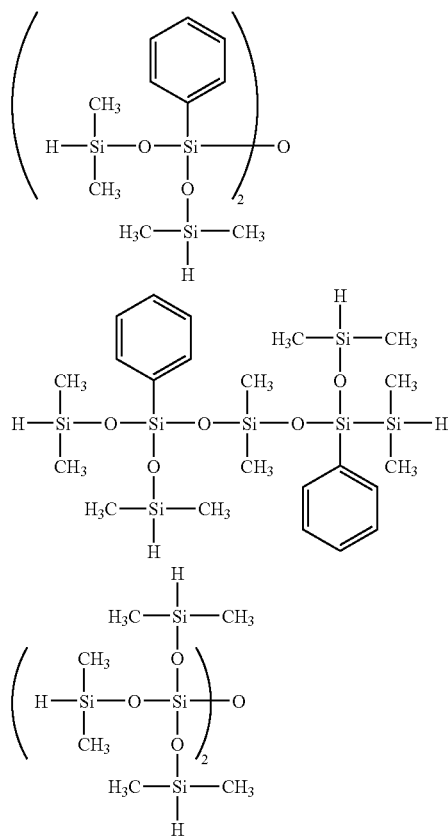

-continued

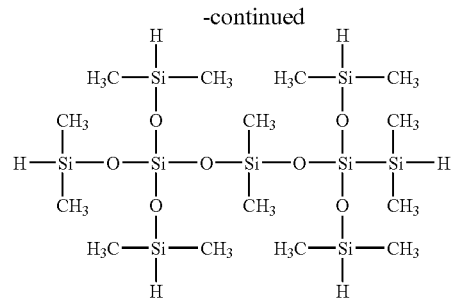

When the organohydrogenpolysiloxane of the component (D) is mixed uniformly with only the alkenyl group-containing organopolysiloxane of the component (C), the resulting two-component mixture is a liquid with a viscosity at 25° C. within a range from 10 to 100,000 mPa·s. If the viscosity of this mixture exceeds 100,000 mPa·s, then it is inadvantageously too high to mold or process the mixture.

-(E) Platinum Group Metal-Based Catalyst-

This catalyst component is added to accelerate the addition curing reaction within the composition of the present invention, and is typically a platinum-based, palladium-based, or rhodium-based catalyst. From the viewpoint of cost, platinum-based catalysts such as platinum, platinum black, chloroplatinic acid, platinum compounds such as $H_2PtCl_6 \cdot mH_2O$, $K_2PtCl_6$, $KHPtCl_6 \cdot mH_2O$, $K_2PtCl_4$, $K_2PtCl_4 \cdot mH_2O$ and $PtO_2 \cdot mH_2O$ (wherein, m represents a positive integer), and complexes of these compounds with hydrocarbons such as olefins, alcohols, or vinyl group-containing organopolysiloxanes are preferred. These catalysts may be used either alone, or in combinations of two or more different catalysts.

The blend quantity of the component (E) need only be sufficient to ensure effective curing, and a typical quantity, calculated as a mass of the platinum group metal relative to the combined mass of the components (A), (B), (C) and (D), is within a range from 0.1 to 500 ppm, and is preferably from 0.5 to 100 ppm.

-Other Additives-

In addition to the components (A) through (E) described above, the composition of the present invention may also include various conventional additives as required.

Inorganic Fillers:

Examples of inorganic fillers include reinforcing inorganic fillers such as fumed silica and fumed titanium dioxide, and non-reinforcing inorganic fillers such as calcium carbonate, calcium silicate, titanium dioxide, ferric oxide, carbon black and zinc oxide. These inorganic fillers may be added to the composition in quantities totaling not more than 600 parts by mass (namely, from 0 to 600 parts by mass) per 100 parts by mass of the combination of components (A) through (D).

Adhesion Assistants

Furthermore, in order to impart adhesiveness to the composition of the present invention, an adhesion assistant may be added as required. Examples of adhesion assistants include straight-chain or cyclic organosiloxane oligomers of 4 to 50 silicon atoms, and preferably 4 to 20 silicon atoms, comprising at least two, and preferably either two or three, functional groups selected from the group consisting of a hydrogen atom bonded to a silicon atom (SiH group), an alkenyl group bonded to a silicon atom (such as a Si—CH═CH$_2$ group), an alkoxysilyl group (such as a trimethoxysilyl group) and an epoxy group (such as a glycidoxypropyl group or 3,4-epoxycyclohexylethyl group) within each molecule; and organooxysilyl-modified isocyanurate compounds represented by a general formula (5) shown below and/or hydrolysis-condensation products thereof (organosiloxane-modified isocyanurate compounds).

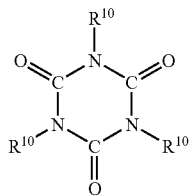
(5)

[wherein, $R^{10}$ represents an organic group represented by a formula (6) shown below:

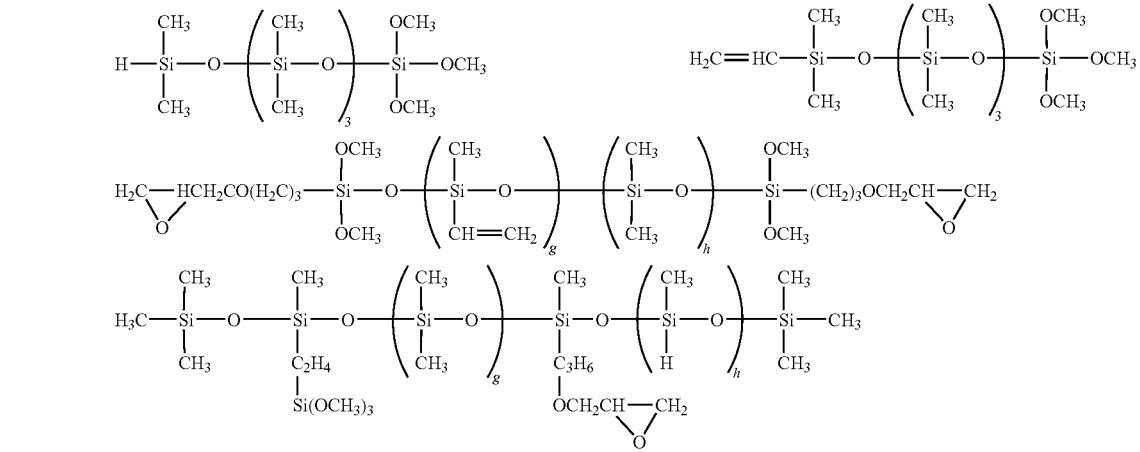

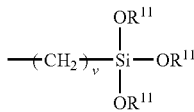
(6)

(wherein, $R^{11}$ represents a hydrogen atom or a monovalent hydrocarbon group of 1 to 6 carbon atoms, and v represents an integer from 1 to 6, and preferably from 1 to 4), or a monovalent hydrocarbon group comprising an aliphatic unsaturated bond, provided that at least one of the $R^{10}$ groups is an organic group of the formula (6)]

Examples of the monovalent hydrocarbon group comprising an aliphatic unsaturated bond represented by $R^{10}$ in the above general formula (5) include alkenyl groups of 2 to 8, and preferably 2 to 6 carbon atoms, such as a vinyl group, allyl group, propenyl group, isopropenyl group, butenyl group, isobutenyl group, pentenyl group or hexenyl group, and cycloalkenyl groups of 6 to 8 carbon atoms such as a cyclohexenyl group. Furthermore, examples of the monovalent hydrocarbon group represented by $R^{11}$ in the formula (6) include monovalent hydrocarbon groups of 1 to 8, and preferably 1 to 6 carbon atoms, including alkyl groups such as a methyl group, ethyl group, propyl group, isopropyl group, butyl group, isobutyl group, tert-butyl group, pentyl group, hexyl group or cyclohexyl group, the alkenyl groups and cycloalkenyl groups exemplified above for the $R^{10}$ group, and aryl groups such as a phenyl group. Of these, alkyl groups are preferred.

Specific examples of adhesion assistants include the compounds listed below. Namely, 1-glycidoxypropyl-1,3,5,7-tetramethylcyclotetrasiloxane, 1,5-glycidoxypropyl-1,3,5,7-tetramethylcyclotetrasiloxane, 1-glycidoxypropyl-5-trimethoxysilylmethyl-1,3,5,7-tetramethylcyclotetrasiloxane, and the compounds shown below.

(wherein, g and h each represent a positive integer from 0 to 100, provided that g+h is within a range from 2 to 50, and preferably from 4 to 20)

-continued

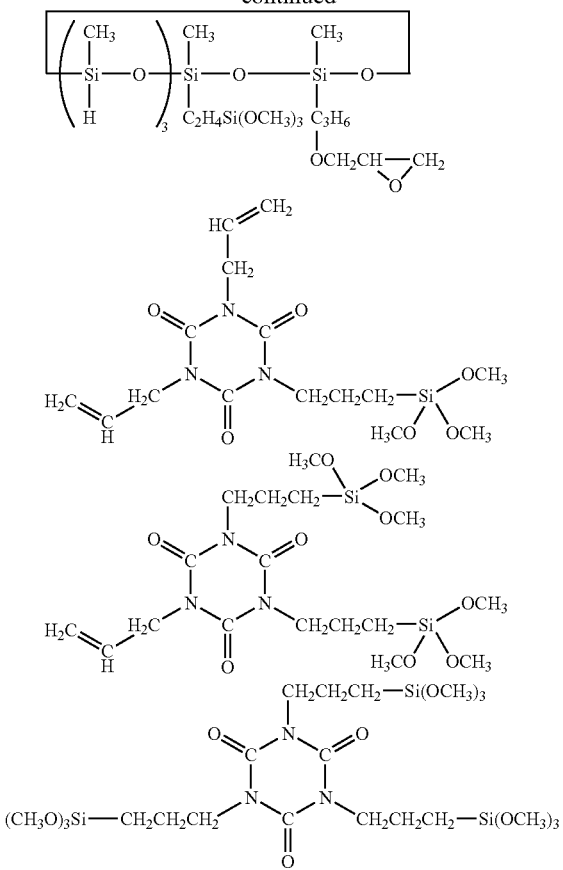

Of the organosilicon compounds described above, organosilicon compounds having a silicon atom-bonded alkoxy group and an alkenyl group or silicon atom-bonded hydrogen atom (SiH group) within each molecule are preferred as they yield cured products with particularly superior adhesion.

The blend quantity of the adhesion assistant is typically not more than 10 parts by mass (namely, from 0 to 10 parts by mass), and is preferably from 0.1 to 8 parts by mass, and even more preferably from 0.2 to 5 parts by mass, per 100 parts by mass of the component (A). A blend quantity that is too large can have adverse effects on the hardness of the cured product, and may increase the surface tack.

Curing Retarders

A curing inhibitor may be added to the composition of the present invention to ensure that the composition can be held in liquid form at room temperature with favorable storage properties. Examples of the curing retarder include organopolysiloxanes with a high vinyl group content such as tetramethyltetravinylcyclotetrasiloxane, triallyl isocyanurate, alkyl maleates, acetylene alcohols and silane-modified or siloxane-modified products thereof, hydroperoxides, tetramethylethylenediamine, benzotriazole, and mixtures of the above compounds. The curing retarder is typically added in a quantity within a range from 0.001 to 1.0 parts by mass, and preferably from 0.005 to 0.5 parts by mass, per 100 parts by mass of the component (A).

Release Agents

Release agents are used to ensure that following compression molding and curing of the silicone resin composition within a molding die, the molded product is able to be extracted from the die without damaging the product.

This release agent should preferably be completely compatible with the other components of the silicone resin composition, and particularly in those cases where a transparent molded product such as a lens is to be produced, the release agent should enable formation of a colorless and transparent cured product. In those cases where the molded cured product of the composition of the present invention is used as a lens for a blue or white colored LED, not only is favorable transparency required, but the release agent must also exhibit a high level of resistance to degradation caused by short wavelength light and discoloration caused by high temperatures. Any release agent that satisfies these requirements may be used, and specific examples include fatty acid-based release agents (including those manufactured by Riken Vitamin Co., Ltd. such as RIKEMAL AZ-01, RIKEMAL B-100, RIKEMAL HC-100, RIKEMAL HC-200, RIKEMAL S-95, RIKEMAL S-200, RIKEMAL TG-12, RIKESTAR EW-100, RIKESTAR EW-200, RIKESTAR EW-250, RIKESTAR EW-400, RIKESTAR EW-440A, and RIKESTAR HT-10), polyethylene-based release agents (including those manufactured by Clariant Ltd. such as LICOWAX PED 136, LICOWAX PED 153 and LICOWAX PED 371FP, and those manufactured by Hoechst AG such as HOE WAX PE 130 PDR, HOE WAX PED 191 PDR, HOE WAX PE 191 PDR, HOE WAX PE 191 Flakes, and HOE WAX PE 520 Powder), carnauba-based release agents (including those manufactured by Toagosei Co., Ltd. such as YTS-040625-03, carnauba candelilla, and refined granulated carnauba), and montanate ester-based release agents (including LICOLUB WE40 and the like, manufactured by Clariant Ltd.). Of these, fatty acid-based release agents exhibit particularly superior levels of compatibility with silicone resins, transparency following curing, and resistance to discoloration following standing at high temperatures.

By adding this type of release agent in a quantity that is typically within a range from 0.05 to 5% by mass, and preferably from 0.1 to 3% by mass, relative to the combined quantity of the components (A) through (E), the molded product such as a lens formed by injection molding or the like can be more easily removed from the molding die. If the quantity of the release agent is too small, then the releasability of the molded product from the die may be unsatisfactory, and if continuous molding is conducted, then adequate releasability can be maintained for only approximately 50 shots at best. Accordingly, in order to ensure favorable releasability, the frequency with which the molding die must be cleaned increases, causing a reduction in the productivity. In contrast, if the quantity of the release agent is too large, then the release agent may bleed from the molded product surface, which can have adverse effects on properties such as the transparency in those cases where the molded product is a lens or the like. If the composition of the present invention is prepared as a two-pot composition, then the release agent may be added to either one of the liquids, or may also be added to both liquids.

Furthermore, even in those cases where superior transparency is required of the composition of the present invention, suitable quantities of conventional antioxidants, ultra fine silica such as Aerosil, and other inorganic fillers for which the refractive index is matched to that of the cured silicone resin may be added to the composition of the present invention for the purpose of improving the mechanical strength or altering the coefficient of expansion, provided the addition of these additives does not impair the transparency. In those cases where transparency is not necessarily required of the composition of the present invention, restrictions on the addition of these optional additives can be relaxed.

The compositions according to the present invention include a composition that consists essentially of the components (A) through (E) as a typical example thereof. The expression "consists essentially of the components (A) through (E)" means that besides the components (A) to (E), the composition may also include at least one of the optional components described above, provided such inclusion does not impair the effects of the present invention.

-Preparation and Curing Conditions-

The silicone resin composition of the present invention is prepared by mixing the required components uniformly together. Typically, the composition is stored as two separate liquids to prevent curing from proceeding, with the two liquids then mixed and cured at the time of use. The composition may also be prepared as a one-pot composition by adding a small quantity of a curing retarder. This type of composition may be prepared so as to undergo curing at room temperature, but usually curing at room temperature is inhibited by the curing retarder, with curing then being initiated when required by applying heat.

Using this composition, a molded product of the desired shape and dimensions can be formed using a molding method such as compression molding, transfer molding or injection molding. Storing and using the composition as a two-pot composition offers improvements in the handling and the productivity. Mixing can be conducted immediately prior to use, using a mixing device such as a mixer or screw mixer, with the resulting mixture then injected directly into the molding apparatus. Although there are no particular restrictions on the molding conditions, the specific conditions used may vary depending on the curability of the silicone resin composition used. Curing can usually be conducted by heating at a temperature of 120 to 180° C. for a period of approximately 30 to 300 seconds. Furthermore, post curing (secondary curing) may also be conducted by heating at a temperature of 50 to 200° C., and particularly at 70 to 180° C., for a period of 0.1 to 10 hours, and preferably for 1 to 4 hours.

The composition of the present invention is a liquid at normal temperatures, and is therefore easy to handle and can be used readily within conventional molding methods and molding apparatus. Furthermore, by adding a solvent, the composition may also be used as a coating material or potting material.

EXAMPLES

Specifics of the present invention are described below based on a series of synthesis examples, examples and comparative examples, although the present invention is in no way limited by the examples presented below. Viscosity values in the following examples refer to values measured at 25° C. Furthermore, the weight average molecular weight values refer to values measured by gel permeation chromatography (GPC) and referenced against polystyrene standards. Ph represents a phenyl group, Me represents a methyl group, and Vi represents a vinyl group.

Synthesis Example 1

(Synthesis of a Component (A))

1713 g (84.4 mol %) of an organosilane represented by $PhSiCl_3$, 699 g (6.2 mol %) of $ClMe_2SiO(Me_2SiO)_{13}SiMe_2Cl$, 91.4 g (4.7 mol %) of $MeViSiCl_2$, and 54.2 g (4.7 mol %) of $Me_2ViSiCl$ were dissolved in toluene solvent, the resulting solution was added dropwise to water to effect a cohydrolysis, the product was washed with water, neutralized by alkali washing, dewatered, and the solvent was then stripped, yielding a vinyl group-containing resin of the component (A) (hereafter referred to as "resin A1"). This resin A1 was a solid with a weight average molecular weight of 46,000 and a melting point of 60° C.

Synthesis Example 2

(Synthesis of a Component (B))

1713 g (84.4 mol %) of the organosilane represented by $PhSiCl_3$, 699 g (6.2 mol %) of $ClMe_2SiO(Me_2SiO)_{13}SiMe_2Cl$, and 85.1 g (9.4 mol %) of $MeHSiCl_2$ were dissolved in toluene solvent, the resulting solution was added dropwise to water to effect a cohydrolysis, the product was washed with water, neutralized by alkali washing, dewatered, and the solvent was then stripped, yielding a hydrosilyl group-containing resin of the component (B) (hereafter referred to as "resin B1"). This resin B1 was a solid with a weight average molecular weight of 42,000 and a melting point of 58° C.

Synthesis Example 3

(Synthesis of a Component (A))

1713 g (84.4 mol %) of the organosilane represented by $PhSiCl_3$, 1365 g (6.2 mol %) of $ClMe_2SiO(Me_2SiO)_{28}SiMe_2Cl$, 91.4 g (4.7 mol %) of $MeViSiCl_2$, and 54.2 g (4.7 mol %) of $Me_2ViSiCl$ were dissolved in toluene solvent, the resulting solution was added dropwise to water to effect a cohydrolysis, the product was washed with water, neutralized by alkali washing, dewatered, and the solvent was then stripped, yielding a vinyl group-containing resin of the component (A) (hereafter referred to as "resin A2"). This resin A2 was a solid with a weight average molecular weight of 58,000 and a melting point of 65° C.

Synthesis Example 4

(Synthesis of a Component (B))

1713 g (84.4 mol %) of the organosilane represented by $PhSiCl_3$, 1365 g (6.2 mol %) of $ClMe_2SiO(Me_2SiO)_{28}SiMe_2Cl$, and 85.1 g (9.4 mol %) of $MeHSiCl_2$ were dissolved in toluene solvent, the resulting solution was added dropwise to water to effect a cohydrolysis, the product was washed with water, neutralized by alkali washing, dewatered, and the solvent was then stripped, yielding a hydrosilyl group-containing resin of the component (B) (hereafter referred to as "resin B2"). This resin B2 was a solid with a weight average molecular weight of 56,000 and a melting point of 62° C.

Synthesis Example 5

(Synthesis of a Component (C))

A mixture containing 54.0 g (55 mol %) of phenyltrichlorosilane, 15.0 g (25 mol %) of dimethyldichlorosilane, and 13.1 g (20 mol %) of methylvinyldichlorosilane was added dropwise over a one hour period, with constant stirring, to a mixed solvent containing 250 g of water and 100 g of toluene heated to a temperature of 80° C. Following completion of the dropwise addition, the reaction mixture was refluxed for 2 hours, yielding a toluene solution of a cohydrolysis-condensation product. The solution was left to stand and cool to room temperature, the water layer was removed, and the toluene layer was washed with water until the wash wastewater was neutral. To the resulting polyorganosiloxane toluene solution (the organic layer 1) was added sufficient KOH to provide a 20-fold excess relative to the chloro fraction, and the resulting mixture was refluxed for two hours. The reaction liquid was then neutralized with trimethylchlorosilane, and water washing was conducted until the toluene layer was neutral (the organic layer 2). This organic layer 2 was dewatered using sodium sulfate, and then filtered to remove impurities. The toluene was removed from the filtrate (under reduced pressure), yielding a polyorganosiloxane of the component (C) in which the relative proportions of the constituent siloxane units are shown in the formula below (and in which each of the structural units was dispersed randomly within the organopolysiloxane resin). Hereafter, this resin is referred to as "the resin C1".

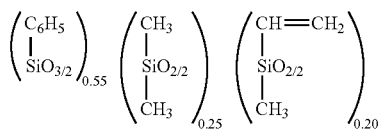

Example 1

100 g of the vinyl group-containing resin of the synthesis example 1 (the resin A1), 100 g of the hydrosilyl group-containing resin of the synthesis example 2 (the resin B1), 70 g of the resin of the synthesis example 3 (the resin C1), 100 g of a straight-chain vinylsiloxane (an oil C2) with a viscosity at 25° C. of 700 mPa·s represented by a formula (7) shown below,

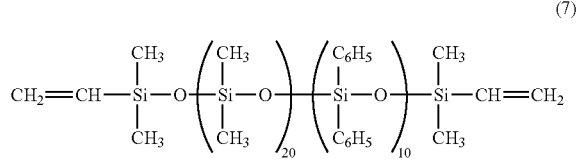

21.7 g of an organohydrogensiloxane (an H-siloxane D1) represented by a formula (8) shown below,

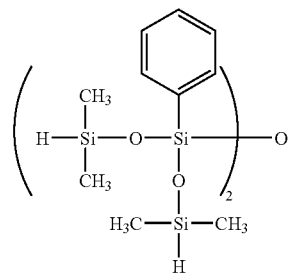

0.2 g of the acetylene alcohol-based compound ethynylcyclohexanol as a reaction retarder, and 0.1 g of an octyl alcohol-modified solution of chloroplatinic acid (a platinum catalyst E1) were mixed thoroughly in a planetary mixer heated at 60° C., yielding a silicone resin composition 1. A uniform mixture of the resin C1 and the oil C2 of the component (C), and the H-siloxane D1 of the component (D) had a viscosity at 25° C. of 10,000 mPa·s. This resin composition 1 was poured into a mold, heat-molded at 150° C. for 5 minutes, and then subjected to secondary curing at 150° C. for 4 hours, thus yielding a cured product.

The composition and the cured product were subjected to the following measurements.

Viscosity of the composition (25° C.): measured using a BL rotational viscometer.

Mechanical properties of the cured product: the tensile strength (0.2 mm thickness), hardness (measured using a type D spring tester), and elongation (0.2 mm thickness) were measured in accordance with JIS K 6301.

Tack finger test: evaluated by touching the surface of the cured product.

Tack silver powder test: the cured product was placed in a sample of commercially available silver powder (average particle size: 5 μm), and following removal from the powder, the product was blown with air to test whether the silver powder on the surface of the product could be removed.

Thermal shock test: the composition was injected onto an aluminum dish (diameter: 6 cm, depth: 0.6 mm) and cured under the conditions described above, and the resulting cured product sample was removed from the aluminum dish and subjected to 100 cycles of a cooling and heating cycle across a temperature range from −50° C. to 150° C. The sample was then checked for the presence of cracks.

The results are shown in Table 1.

Example 2

100 g of the resin A1, 100 g of the resin B1, 20 g of the resin C1, 30 g of the oil C2, 9.2 g of the H-siloxane D1, 0.2 g of the acetylene alcohol-based compound ethynylcyclohexanol as a reaction retarder, and 0.1 g of the platinum catalyst E1 were mixed thoroughly in a planetary mixer heated at 60° C., yielding a silicone resin composition 2. A uniform mixture containing only the above quantities of the resin C1, the oil C2 and the H-siloxane D1 had a viscosity at 25° C. of 3,500 mPa·s.

The viscosity of the thus obtained resin composition 2 was measured in the same manner as that described for the example 1. Furthermore, a molded cured product was prepared from the composition and subsequently subjected to secondary curing using the same method as that described in the example 1, and the properties of the resulting cured product were measured in the same manner as the example 1. The results are shown in Table 1.

Example 3

100 g of the resin A2, 100 g of the resin B2, 20 g of the resin C1, 100 g of a straight-chain vinylsiloxane (an oil C3) with a viscosity at 25° C. of 500 mPa·s represented by a formula (9) shown below, 9.2 g of the above H-siloxane D1, 0.2 g of the acetylene alcohol-based compound ethynylcyclohexanol as a reaction retarder, and 0.1 g of the octyl alcohol-modified solution of chloroplatinic acid were mixed thoroughly in a planetary mixer heated at 60° C., yielding a silicone resin composition 3. A uniform mixture containing only the above quantities of the resin C1, the oil C3 and the H-siloxane D1 had a viscosity at 25° C. of 3,000 mPa·s.

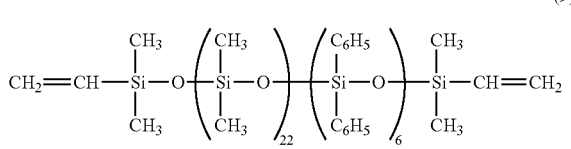

(9)

The viscosity of the thus obtained resin composition 3 was measured in the same manner as that described for the example 1. Furthermore, a molded cured product was prepared from the composition and subsequently subjected to secondary curing using the same method as that described in the example 1, and the properties of the resulting cured product were measured in the same manner as the example 1. The results are shown in Table 1.

Comparative Example 1

With the exception of replacing the above silicone resin composition 1 with a commercially available varnish KJR-632 (a product name, manufactured by Shin-Etsu Chemical Co., Ltd.) comprising an addition reaction curable silicone resin composition containing a vinyl group-containing organopolysiloxane resin as the base polymer, a molded cured product was prepared and subsequently subjected to secondary curing using the same method as that described in the example 1, and the properties of the resulting cured product were then measured in the same manner as the example 1. The results are shown in Table 1.

Comparative Example 2

With the exception of replacing the above silicone resin composition 1 with a commercially available product KJR-632L-1 (a product name, manufactured by Shin-Etsu Chemical Co., Ltd.) comprising an addition reaction curable silicone resin composition containing a vinyl group-containing organopolysiloxane resin as the base polymer, a molded cured product was prepared, subsequently subjected to secondary curing, and then evaluated in the same manner as the example 1. The results are shown in Table 1.

position 1, and to 100 parts by mass of this resin composition was added 1.0 parts by mass of a fatty acid-based release agent (RIKESTAR EW-440A, pentaerythritol tetrastearate, manufactured by Riken Vitamin Co., Ltd.). The resulting mixture was stirred thoroughly, yielding a release agent-containing silicone resin composition 4.

This resin composition 4 was subjected to the following tests and evaluations.

1) Viscosity of the Composition

The viscosity at 25° C. was measured using a BL rotational viscometer.

2) Mechanical Properties of the Cured Product

The composition was heated to 60° C. and subjected to injection molding using an injection molding apparatus, and heat curing was then conducted for 5 minutes at 150° C., yielding a hollow lens 1 as shown in FIG. 1 (a front view). When viewed from above (namely, in a plan view not shown in the drawings), the lens was a circular shape with a diameter of 3.0 mm. The lens had a height of 1.6 mm, and as shown by the inner wall surface represented by the dotted line 2 in the figure, was a hollow shape that was open at one end. The thickness of the lens wall was 0.1 mm, and the internal height of the hollow portion was 1.5 mm. The lens was subjected to secondary curing at 150° C. for 4 hours, and the tensile strength (0.2 mm thickness), hardness (measured using a type D spring tester), and elongation (0.2 mm thickness) were measured in accordance with JIS K 6251 and JIS K 6253.

3) Shock Resistance (Drop Test)

Figure 2:
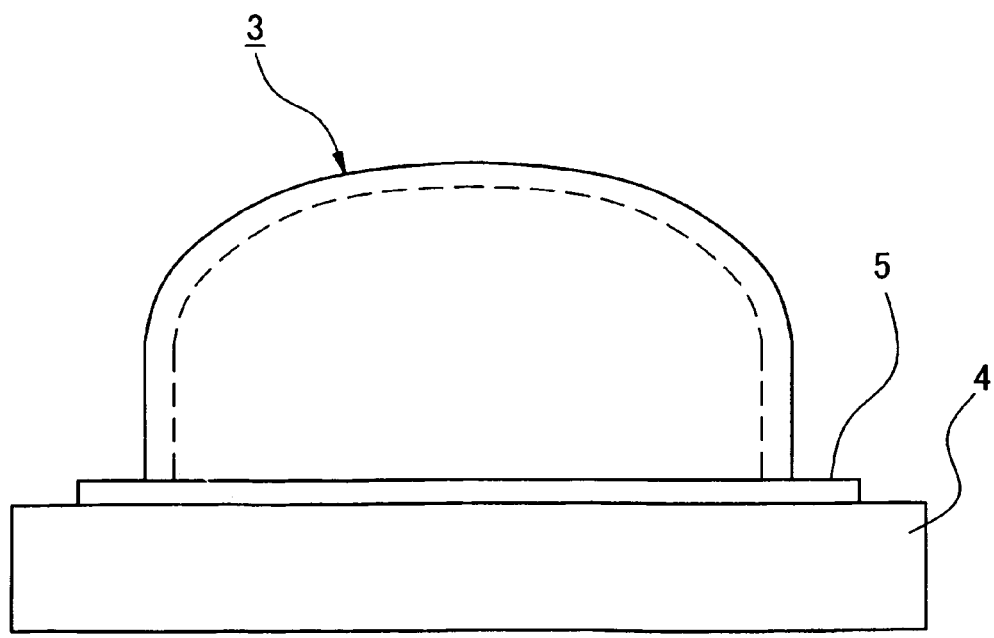
FIG. 2 is a front view of a test piece used in a drop test for measuring the shock resistance in the examples.

A hollow lens of the same shape and dimensions as those described above was molded under the same conditions as those described above. As shown in FIG. 2 (a front view), a test piece was then prepared by bonding the lens 3 to a 3 g spindle 4 using a double-sided pressure-sensitive adhesive tape 5. This test piece was dropped from a height of 1 m onto a polyvinyl chloride tile with the lens 3 facing downward, and the lens was then inspected for the presence of cracks.

4) Surface Tack

The surface tack of a cured product that had undergone secondary curing in the manner described above was evaluated by touch. In addition, the cured product was placed in a sample of commercially available silver powder (average

TABLE 1

| | Example 1 | Example 2 | Example 3 | Comparative example 1 | Comparative example 2 |
| --- | --- | --- | --- | --- | --- |
| Composition viscosity (25° C.) (Pa·s) | 200 | 3,600 | 4,000 | 5 | 4 |
| Secondary curing conditions | 150° C. × 4 hr | 150° C. × 4 hr | 150° C. × 4 hr | 150° C. × 4 hr | 150° C. × 4 hr |
| Hardness (type D) | 25 | 43 | 40 | 70 | 52 |
| Elongation (%) | 100 | 80 | 80 | 0 | 0 |
| Tensile strength (MPa) | 9 | 9 | 9 | 2 | 2 |
| Dust adhesion caused by surface tack | None | None | None | None | None |
| −50° C. to 150° C. thermal shock test (100 cycles) | No cracks | No cracks | No cracks | Cracks evident | Cracks evident |

Example 4

Using the same method as the example 1, a composition was prepared in the same manner as the silicone resin composition particle size: 5 μm), and following removal from the powder, the product was blown with air to test whether the silver powder that had adhered to the surface like dust could be removed.

5) Thermal Shock Resistance

A cured sample was subjected to 100 cycles of a cooling and heating cycle across a temperature range from −50° C. to 150° C. (1 cycle: 30 minutes), and the sample was then checked for the presence of cracks.

The results of each of these measurements are shown in Table 2.

6) Heat Resistance

A lens molded under the same conditions as those described above was subjected to secondary curing at 150° C. for 4 hours, and was then passed three times through an IR reflow oven which was set so that the peak temperature of 260° C. was maintained for 15 seconds. The lens was then inspected for discoloration and deformation.

7) Transmittance of Light of Wavelength 400 nm

Using a resin composition that had been heated to 60° C., a sheet-like test piece with a thickness of 1 mm was prepared by injection molding under conditions including heating at 150° C. for a period of 5 minutes. This test piece was then subjected to secondary curing at 150° C. for 4 hours, and the transmittance of light of wavelength 400 nm through the test piece was measured. Subsequently, the test piece was stored for either 24 hours or 48 hours in a 200° C. drier, and following removal from the drier, the light transmittance at a wavelength of 400 nm was remeasured.

The results are shown in Table 3.

Example 5

Using the silicone resin composition 2 prepared in the example 2, a molded cured product was prepared and subsequently subjected to secondary curing using the same method as that described in the example 4, and the properties of the resulting cured product were then measured in the same manner as the example 4. The results are shown in Table 2 and Table 3.

Synthesis Example 6

A mixture comprising 698 parts by mass of phenyltrichlorosilane, 169 parts by mass of methylvinyldichlorosilane, 194 parts by mass of dimethyldichlorosilane and 530 parts by mass of toluene was added dropwise over a 60 minute period, with vigorous stirring, to 2,500 parts by mass of water. Following completion of the dropwise addition, the mixture was stirred for a further 60 minutes, and was then washed with water until neutral. Following water washing, the solvent level was adjusted to form a toluene solution with a siloxane concentration of 25% by mass, and 0.42 parts by mass of potassium hydroxide was then added to the solution. The mixture was then heated for 5 hours under reflux to effect a polymerization. Following reaction, 13.8 parts by mass of trimethylchlorosilane was added to the reaction mixture, stirring was continued for a further 60 minutes at room temperature, and the alkali was then neutralized. Subsequently, the reaction liquid was filtered, and the toluene was removed by heating under reduced pressure, yielding a transparent vinyl group-containing organopolysiloxane.

Comparative Example 3

To 50 parts by mass of a polysiloxane (VF) represented by a formula (1) shown below:

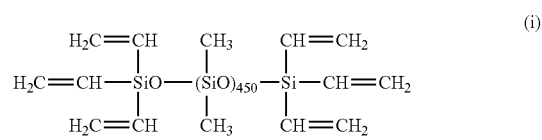

were added 50 parts by mass of a vinylmethylsiloxane (VMQ) with a resin structure comprising 50 mol % of $SiO_2$ units, 42.5 mol % of $(CH_3)_3SiO_{0.5}$ units and 7.5 mol % of $Vi_3SiO_{1.5}$ units, a sufficient quantity of the organohydrogenpolysiloxane represented by the above formula (8) to provide 1.5 mols of SiH groups for each 1 mol of vinyl groups within the combination of the VF and VMQ components, and 0.05 parts by mass of the octyl alcohol-modified solution of chloroplatinic acid. The resulting mixture was stirred thoroughly, yielding a silicone resin composition (comparison 3).

The viscosity of the thus obtained composition (comparison 3) was measured in the same manner as that described for the example 4. Furthermore, a molded cured product was prepared from the composition (comparison 3) and subsequently subjected to secondary curing using the same method as that described in the example 4, and the properties of the resulting cured product were measured in the same manner as the example 4. The results are shown in Table 2 and Table 3.

Comparative Example 4

To 100 parts by mass of the vinyl group-containing organopolysiloxane synthesized in the synthesis example 6 were added 30 parts by mass of the organohydrogenpolysiloxane represented by the above formula (8) and 0.05 parts by mass of a 1 mass % octyl alcohol-modified solution of chloroplatinic acid, yielding a silicone resin composition (comparison 4).

The viscosity of the thus obtained composition (comparison 4) was measured in the same manner as that described for the example 1. Furthermore, a molded cured product was prepared from the composition (comparison 4) and subsequently subjected to secondary curing using the same method as that described in the example 4, and the properties of the resulting cured product were measured in the same manner as the example 4. The results are shown in Table 2 and Table 3.

TABLE 2

|  | Example 4 | Example 5 | Comparative example 3 | Comparative example 4 |
| --- | --- | --- | --- | --- |
| Viscosity (Pa · s) | 200 | 3,600 | 5 | 10 |
| Secondary curing conditions | 150° C. × 4 hr | 150° C. × 4 hr | 150° C. × 4 hr | 150° C. × 4 hr |

TABLE 2-continued

|  | Example 4 | Example 5 | Comparative example 3 | Comparative example 4 |
|---|---|---|---|---|
| Hardness (type D) | 25 | 43 | 35 | 70 |
| Elongation (%) | 100 | 80 | 20 | 0 |
| Tensile strength (MPa) | 9 | 9 | 2 | 2 |
| Burr formation upon molding | No | No | Yes | Yes |
| Drop test | No cracks | No cracks | Cracks evident | Cracks evident |
| Dust adhesion caused by surface tack | No | No | No | No |
| −50° C. to 150° C. thermal shock test (100 cycles) | No cracks | No cracks | Cracks evident | Cracks evident |

TABLE 3

|  |  | Example | | Comparative example | |
|---|---|---|---|---|---|
|  |  | 4 | 5 | 3 | 4 |
| Heat resistance | | No discoloration | No discoloration | No discoloration | No discoloration |
| Light transmittance at a wavelength of 400 nm | Initial | 98% | 98% | 97% | 98% |
|  | After 24 hours at 200° C. | 98% | 98% | 95% | 95% |
|  | After 48 hours at 200° C. | 95% | 96% | 95% | 94% |

INDUSTRIAL APPLICABILITY

Upon curing, the composition of the present invention forms a cured product with a high degree of hardness, minimal surface tack, and excellent flexibility and shock resistance. Accordingly, the composition can be used as a protective coating material, potting material, casting material or molding agent for electrical or electronic components, and can also be used for all manner of general-purpose silicone applications such as the surface coating for silicone rubber keyboards. The cured product is particularly useful in applications where the adhesiveness of conventional silicone products would normally cause problems.

In particular, a silicone lens of the present invention produced using the composition is very useful as a lens within light emitting devices such as LEDs.

What is claimed is:

1. An addition curable silicone resin composition, comprising:

(A) an organopolysiloxane having a resin structure comprising $R^1SiO_{1.5}$ units, $R^2{}_2SiO$ units and $R^3{}_aR^4{}_bSiO_{(4-a-b)/2}$ units wherein, $R^1$, $R^2$ and $R^3$ each represent, independently, a hydroxyl group, methyl group, ethyl group, propyl group, cyclohexyl group or phenyl group, each $R^4$ represents, independently, a vinyl group or allyl group, a represents 0, 1 or 2, and b represents 1 or 2, provided that a+b is 2 or 3, in which at least a portion of the $R^2{}_2SiO$ units are connected in a continuous repeating sequence, and a number of units in the repeating sequence is within a range from 5 to 50, (B) an organohydrogenpolysiloxane having a resin structure comprising $R^1SiO_{1.5}$ units, $R^2{}_2SiO$ units and $R^3{}_cH_dSiO_{(4-c-d)/2}$ units wherein, $R^1$, $R^2$ and $R^3$ are as defined above, c represents 0, 1 or 2, and d represents 1 or 2, provided that c+d is 2 or 3, in which at least a portion of the $R^2{}_2SiO$ units are connected in a continuous repeating sequence, and a number of units in the repeating sequence is within a range from 5 to 50, the organohydrogenpolysiloxane provided in sufficient quantity that a molar ratio of hydrogen atoms bonded to silicon atoms within component (B) relative to a combined total of vinyl groups and allyl groups within component (A) is within a range from 0.1 to 4.0, (C) an organopolysiloxane having two or more alkenyl groups within each molecule, which is different from the component (A) and is either a liquid or a solid at 25° C., (D) an organohydrogenpolysiloxane having two or more hydrogen atoms bonded to silicon atoms within each molecule, which has a viscosity at 25° C. within a range from 0.5 to 50,000 mPa·s, and in a mixed state with the organopolysiloxane of component (C), has a viscosity at 25° C. within a range from 10 to 100,000 mPa·s, wherein quantities of component (C) and component (D) are sufficient that a molar ratio of a combined quantity of hydrogen atoms bonded to silicon atom within component (B) and component (D), relative to a combined quantity of alkenyl groups within component (A) and component (C), is within a range from 0.1 to 4.0, and (E) an effective curing quantity of a platinum group metal-based catalyst.

2. The addition curable silicone resin composition according to claim 1, wherein either one of, or both, component (A) and component (B) contain a silanol group.

3. The addition curable silicone resin composition according to claim 1, wherein the organopolysiloxane having two or more alkenyl groups of component (C) comprises:

from 30 to 100% by mass of an organopolysiloxane represented by an average composition formula (1):

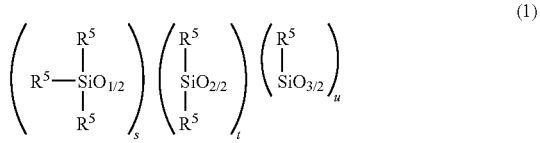

wherein, $R^5$ represents identical or different, substituted or unsubstituted monovalent hydrocarbon groups, from 1.0 to 50.0% of all the monovalent hydrocarbon groups are alkenyl groups, s, t and u indicate relative molar quantities of the three siloxane units to which they are appended, $u/(s+t+u)=0.55$ to 0.95, $t/(s+t+u)=0.05$ to 0.45, and $s/(s+t+u)=0$ to 0.05, and from 0 to 70% by mass of a straight-chain organopolysiloxane represented by an average composition formula (2):

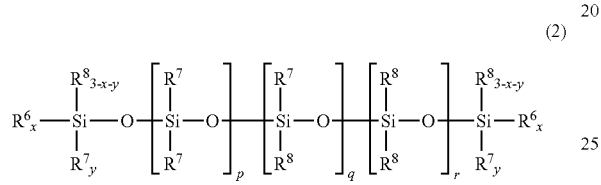

wherein, $R^6$ represents an alkenyl group, $R^7$ represents identical or different, substituted or unsubstituted monovalent hydrocarbon groups, $R^8$ represents an aromatic monovalent hydrocarbon group, p, q and r are integers that satisfy $0 \leq p \leq 500$, $0 \leq q \leq 250$ and $0 \leq r \leq 250$ respectively, provided that $0 \leq p+q+r \leq 500$, and x and y are each 0, 1, 2 or 3, provided that $0 \leq x+y \leq 3$, and a combined total of the organopolysiloxane represented by the average composition formula (1) and the organopolysiloxane represented by the average composition formula (2) is 100% by mass.

4. A cured product obtained by curing an addition curable silicone resin composition, wherein the addition curable silicone resin composition comprises:

(A) an organopolysiloxane having a resin structure comprising $R^1SiO_{1.5}$ units, $R^2_2SiO$ units and $R^3_aR^4_bSiO_{(4-a-b)/2}$ units wherein, $R^1$, $R^2$ and $R^3$ each represent, independently, a hydroxyl group, methyl group, ethyl group, propyl group, cyclohexyl group or phenyl group, each $R^4$ represents, independently a vinyl group or allyl group, a represents 0, 1 or 2, and b represents 1 or 2, provided that a+b is 2 or 3, in which at least a portion of the $R^2_2SiO$ units are connected in a continuous repeating sequence, and a number of units in the repeating sequence is within a range from 5 to 50, (B) an organohydrogenpolysiloxane having a resin structure comprising $R^1SiO_{1.5}$ units, $R^2_2SiO$ units and $R^3_cH_dSiO_{(4-c-d)/2}$ units wherein, $R^1$, $R^2$ and $R^3$ are as defined above, c represents 0, 1 or 2, and d represents 1 or 2, provided that c+d is 2 or 3, in which at least a portion of the $R^2_2SiO$ units are connected in a continuous repeating sequence, and a number of units in the repeating sequence is within a range from 5 to 50, the organohydrogenpolysiloxane provided in sufficient quantity that a molar ratio of hydrogen atoms bonded to silicon atoms within component (B) relative to a combined total of vinyl groups and allyl groups within component (A) is within a range from 0.1 to 4.0, (C) an organopolysiloxane having two or more alkenyl groups within each molecule, which is different from the component (A) and is either a liquid or a solid at 25° C., (D) an organohydrogenpolysiloxane having two or more hydrogen atoms bonded to silicon atoms within each molecule, which has a viscosity at 25° C. within a range from 0.5 to 50,000 mPa·s, and in a mixed state with the organopolysiloxane of component (C), has a viscosity at 25° C. within a range from 10 to 100,000 mPa·s, wherein quantities of component (C) and component (D) are sufficient that a molar ratio of a combined quantity of hydrogen atoms bonded to silicon atom within component (B) and component (D), relative to a combined quantity of alkenyl groups within component (A) and component (C), is within a range from 0.1 to 4.0, and (E) an effective curing quantity of a platinum group metal-based catalyst.

5. The cured product according to claim 4, wherein the cured product is in the form of a colorless and transparent silicone lens.

* * * * *

UNITED STATES PATENT AND TRADEMARK OFFICE
CERTIFICATE OF CORRECTION

PATENT NO.       : 7,566,756 B2
APPLICATION NO.  : 12/078689
DATED            : July 28, 2009
INVENTOR(S)      : Tsutomu Kashiwagi It is certified that error appears in the above-identified patent and that said Letters Patent is hereby corrected as shown below:

On the title page, please add the following Foreign Application Priority Data (Item 30):

--April 6, 2007 (JP) 2007-101032
April 8, 2007 (JP) 2007-101161--

Signed and Sealed this
Thirteenth Day of March, 2012

David J. Kappos
*Director of the United States Patent and Trademark Office*

UNITED STATES PATENT AND TRADEMARK OFFICE
CERTIFICATE OF CORRECTION

PATENT NO. : 7,566,756 B2  Page 1 of 1
APPLICATION NO. : 12/078689
DATED : July 28, 2009
INVENTOR(S) : Tsutomu Kashiwagi It is certified that error appears in the above-identified patent and that said Letters Patent is hereby corrected as shown below:

On the title page, please add the following Foreign Application Priority Data (Item 30):

--April 6, 2007 (JP) 2007-101032
          April 6, 2007 (JP) 2007-101161--

This certificate supersedes the Certificate of Correction issued March 13, 2012.

Signed and Sealed this
First Day of May, 2012

David J. Kappos
*Director of the United States Patent and Trademark Office*